(12) United States Patent
Ihara

(10) Patent No.: US 7,295,426 B2
(45) Date of Patent: Nov. 13, 2007

(54) SOLID ELECTROLYTIC CAPACITOR AND MANUFACTURING METHOD THEREFOR

(75) Inventor: Hayatoshi Ihara, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/392,546

(22) Filed: Mar. 30, 2006

(65) Prior Publication Data

US 2006/0221553 A1    Oct. 5, 2006

(30) Foreign Application Priority Data

Mar. 31, 2005    (JP) .............................. 2005-104955

(51) Int. Cl.
*H01G 9/00* (2006.01)
(52) U.S. Cl. .................. 361/523; 361/525; 361/528; 361/529; 361/534; 361/540; 29/25.01; 29/25.03
(58) Field of Classification Search ........ 361/523–525, 361/528–530, 534–540, 516–519; 29/25.01, 29/25.03
See application file for complete search history.

(56) References Cited

U.S. PATENT DOCUMENTS 5,608,602 A * 3/1997 Kuriyama .................. 361/534
5,850,332 A * 12/1998 Kunieda et al. ............. 361/523
6,188,566 B1 * 2/2001 Aoyama ..................... 361/534
6,262,878 B1 * 7/2001 Shirashige et al. ......... 361/508
6,430,034 B2 * 8/2002 Sano et al. ................. 361/528
6,625,009 B2 * 9/2003 Maeda ....................... 361/528

FOREIGN PATENT DOCUMENTS

| JP | 10-64761 | 3/1998 |
| JP | 2001-244145 | 9/2001 |
| JP | 2003-68588 | 3/2003 |

* cited by examiner

*Primary Examiner*—Nguyen T. Ha
(74) *Attorney, Agent, or Firm*—Westerman, Hattori, Daniels & Adrian, LLP.

(57) ABSTRACT

A manufacturing method for a solid electrolytic capacitor of the present invention includes producing a terminal frame having aligned therein unit terminal areas each including an anode terminal portion and a cathode terminal portion, placing a rod-like piece on a surface of the terminal frame across a plurality of aligned anode terminal portions, and fixing the rod-like piece to the terminal frame by welding. Thereafter, a solid electrolytic capacitor is provided through a placement of a capacitor element, charge of a mold resin, and a cutting process.

7 Claims, 9 Drawing Sheets

A-A断面

SOLID ELECTROLYTIC CAPACITOR AND MANUFACTURING METHOD THEREFOR

The priority application Number 2005-104955 upon which this patent application is based is hereby incorporated by reference.

BACKGROUND OF THE INVENTION

1. Field of the Invention

The present invention relates to a solid electrolytic capacitor having an anode terminal exposed from a mold resin portion coating a capacitor element and being capable of being surface-mounted, and to a manufacturing method therefor.

2. Description of Related Art

A solid electrolytic capacitor having a structure shown in FIG. 13 has been conventionally known. A capacitor element 27 included in the solid electrolytic capacitor includes an anode element 25 made of a sintered body of a valve-action metal (tantalum, niobium, titanium, aluminum, etc.), a dielectric coating 24 made by oxidizing a surface layer of the anode element, and a cathode layer 23 having sequentially formed therein a solid electrolyte layer 21 made of a conductive inorganic material such as manganese dioxide or a conductive organic material such as TCNQ complex salt, a conductive polymer, etc. and a cathode lead layer 22 made of carbon, silver, etc. An anode lead frame 52 is connected to an anode lead member 26 planted on one end surface of the anode element 25, while a cathode lead frame 42 is connected to the cathode layer 23. A periphery of the capacitor element 27 is coated and sealed by a mold resin portion 72 made of epoxy resin or the like. The anode lead frame 52 and the cathode lead frame 42 are bent along a surface of the mold resin portion 72 (see JP 10-64761 A).

However, there has been a problem that the capacitor element 27 cannot be sufficiently large in overall size relative to a solid electrolytic capacitor finished product because the solid electrolytic capacitor of the above-described structure needs to have an entire periphery of the capacitor element 27 coated with a mold resin. Accordingly, there has been proposed a technique, as shown in FIG. 14, of incorporating a capacitor element 20 with a larger occupying volume relative to an overall size of a solid electrolytic capacitor finished product by mounting the capacitor element 20 on a platy anode terminal 50 and cathode terminal 40 to make a gap as small as possible between an outer peripheral surface of the capacitor element 20 and an outer peripheral surface of a mold resin portion 70 (JP 2001-244145 A). In a solid electrolytic capacitor 10 shown in FIG. 14, an anode lead member 30 projecting from the capacitor element 20 is connected to the anode terminal 50 via a bolster member 60. In a manufacturing process for the solid electrolytic capacitor 10, as shown in FIG. 15, a terminal frame 90 is produced which is provided with an H-shaped opening 98 to have an anode terminal portion 97 and a cathode terminal portion 96. Thereafter, the bolster member 60 is placed on the anode terminal portion 97 of the terminal frame 90, and then the bolster member 60 is connected to the terminal frame 90 by resistance welding. Next, the capacitor element 20 is placed on the terminal frame 90 to connect the anode lead member 30 of the capacitor element 20 to the bolster member 60 and also to connect a cathode portion to the cathode terminal portion 96. Then, after the capacitor element 20 is coated with a mold resin, the solid electrolytic capacitor 10 shown in FIG. 14 is finished through a cutting process using a dicing saw.

In the above-described solid electrolytic capacitor, an ESR (Equivalent Series Resistance) and an ESL (Equivalent Series Inductance) in the solid electrolytic capacitor finished product can be reduced because it is unnecessary to provide a lead frame bent along a surface of an enclosure resin part as conventionally, so that a current path from the capacitor element to a circuit board can be shortened.

However, in the manufacturing process for the solid electrolytic capacitor shown in FIG. 14, it is necessary to accurately place the bolster member 60 with an extremely short length of the order of 0.7 mm on the anode terminal portion 97 of the terminal frame 90 with a width of the order of 1.4 mm as shown in FIG. 15. Therefore, especially in a manufacturing process in which many capacitor elements 20 are mounted on the terminal frame 90 having many unit terminal areas formed therein each including the anode terminal portion 97 and the cathode terminal portion 96, it is extremely difficult to position and fix bolster members 60 one by one on respective anode terminal portions 97 of the unit terminal areas. This has been causing a problem of poor productivity.

SUMMARY OF THE INVENTION

An object of the present invention is to provide a structure of a solid electrolytic capacitor capable of providing high productivity, and a manufacturing method therefor.

A solid electrolytic capacitor of the present invention includes a capacitor element including an anode portion and a cathode portion and having an anode lead member projected from the anode portion, an anode terminal electrically connected to the anode lead member, a cathode terminal placed on a reverse surface of the capacitor element and electrically connected to the cathode portion, and a mold resin portion coating the capacitor element, the anode terminal and the cathode terminal, the anode terminal and the cathode terminal being exposed from the mold resin portion. A bolster member between the anode lead member and the anode terminal makes an electrical connection between the anode lead member and the anode terminal, the bolster member being formed so as to have a rectangular cross section, and having both ends thereof extended to both side surfaces of the mold resin portion to expose both end surfaces thereof from both the side surfaces of the mold resin portion.

Specifically, the bolster member and the anode terminal are irradiated with a laser beam from the cathode terminal side and joined to each other by laser welding.

The above-described solid electrolytic capacitor of the present invention may be produced by a manufacturing method of the present invention described below.

The manufacturing method for a solid electrolytic capacitor of the present invention includes a terminal frame producing step of producing a metal terminal frame having aligned in one or more lines unit terminal areas each including an anode terminal portion and a cathode terminal portion to serve as an anode terminal and a cathode terminal of one solid electrolytic capacitor, a united frame producing step of placing a metal rod-like piece on a surface of the produced terminal frame along a plurality of aligned anode terminal portions across these anode terminal portions, and fixing the rod-like piece to the terminal frame to thereby produce a united frame, an element complex producing step of placing capacitor elements in the respective unit terminal areas of the produced united frame, and covering these capacitor elements by a mold resin, with an anode lead member of each capacitor element being joined to the rod-like piece of the united frame and with a cathode portion thereof being joined to the cathode terminal portion, to thereby produce an element complex, and a cutting step of cutting the produced element complex for each capacitor element to provide a plurality of solid electrolytic capacitors.

According to the above-described manufacturing method for a solid electrolytic capacitor of the present invention, the element complex produced by the element complex producing step is cut for each capacitor element at the cutting step, so that the rod-like piece is cut into the bolster member for each capacitor element, while the terminal frame is cut to allow the anode terminal portion and the cathode terminal portion to serve as the anode terminal and the cathode terminal, respectively, to provide the solid electrolytic capacitor of the present invention.

Because the mold resin and the rod-like piece are cut at a time in the cutting step for the element complex, the solid electrolytic capacitor provided through the cutting step will have the bolster member having both the end surfaces thereof exposed to both the side surfaces of the mold resin portion.

In the above-described manufacturing method for a solid electrolytic capacitor of the present invention, the rod-like piece is placed on the surface of the terminal frame at the united frame producing step, so that the rod-like piece is placed across a plurality of aligned anode terminal portions of the terminal frame. Therefore, accurate positioning of the rod-like piece relative to the terminal frame will result in accurate positioning of the rod-like piece relative to the plurality of anode terminal portions.

Therefore, the positioning is easier and more efficient than that of the conventional manufacturing method in which bolster members are positioned one by one relative to the respective anode terminal portions of the terminal frame having a plurality of unit terminal areas formed therein.

Specifically, the terminal frame producing step includes producing a terminal frame having a plurality of unit terminal areas arranged in rows and columns in a matrix form, and the united frame producing step includes preparing a metal bolster frame having rod-like pieces arranged parallel at row spacings of the unit terminal areas, and laying the bolster frame on a surface of the terminal frame to fix the rod-like pieces to respective surfaces of a plurality of anode terminal portions aligned in columns.

According to the specific process, the bolster frame is placed on the surface of the terminal frame, so that the plurality of rod-like pieces of the bolster frame are placed across all anode terminal portions aligned in a matrix form in the terminal frame. Therefore, accurate positioning of the bolster frame relative to the terminal frame will result in accurate positioning of each rod-like piece relative to the plurality of anode terminal portions. This allows easier positioning to improve positioning accuracy.

More specifically, the united frame producing step includes fixing the bolster frame to the terminal frame by laser welding.

If laser welding is used as a method for fixing the bolster frame to the terminal frame as described, poor welding caused by dissipation of heat of welds through the rod-like pieces can be more effectively prevented than in the case of using resistance welding.

More specifically, the united frame producing step includes irradiating a laser beam from the cathode terminal portion side to joints of the rod-like pieces and the anode terminal portions when the bolster frame is fixed to the terminal frame by laser welding.

As a result, welded fixed portions are formed at ends of the cathode terminal portion side in the joints of the rod-like pieces and the anode terminal portions. Therefore, the welded fixed portions between the rod-like pieces and the anode terminal portions are not cut even if a minor error occurs in a cutting position when the element complex is cut for each solid electrolytic capacitor at the cutting step.

Further specifically, the bolster frame is provided by providing a plurality of rectangular openings at constant intervals in a metal plate, and the rod-like piece is defined between two adjacent rectangular openings. The terminal frame and the bolster frame have formed thereon a positioning portion and a positioning receiving portion to engage each other for positioning both the frames.

As described above, according to the solid electrolytic capacitor and manufacturing method therefor of the present invention, the positioning at the united frame producing step is easy and efficient, and therefore can provide higher productivity than conventionally.

DETAILED DESCRIPTION OF THE INVENTION

An embodiment of the present invention will be specifically described below with reference to the drawings.

Figure 1:
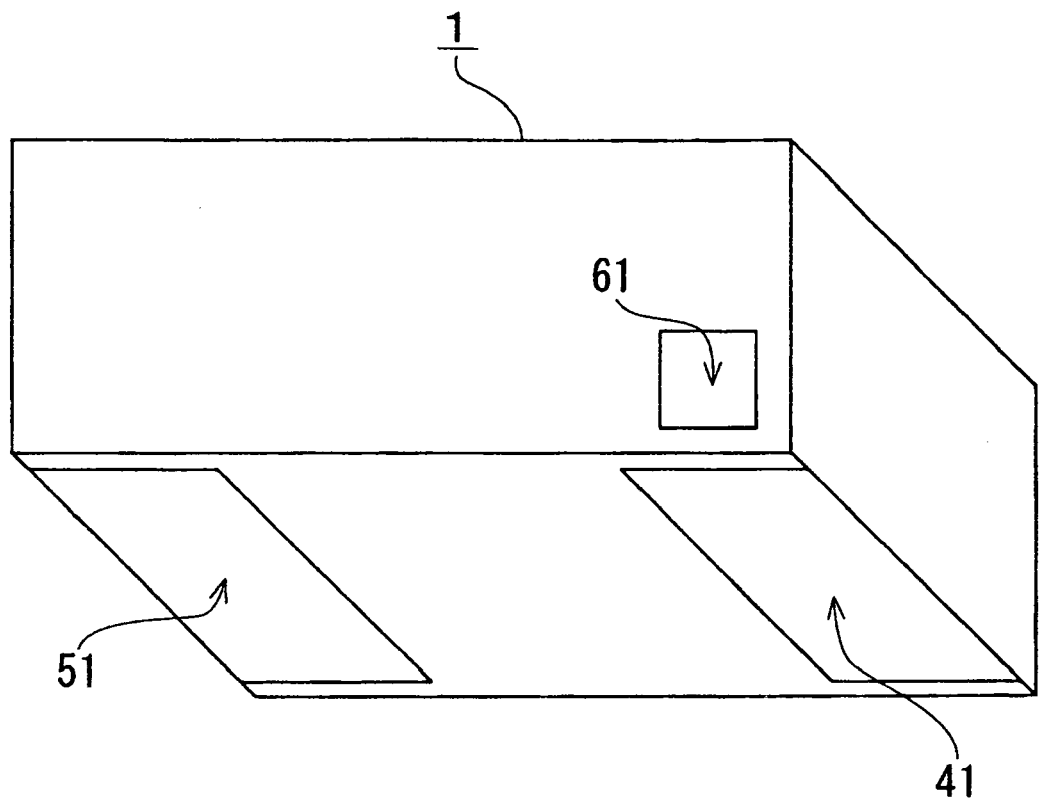
FIG. 1 is a perspective view showing a reverse surface of a solid electrolytic capacitor of the present invention.
Figure 2:
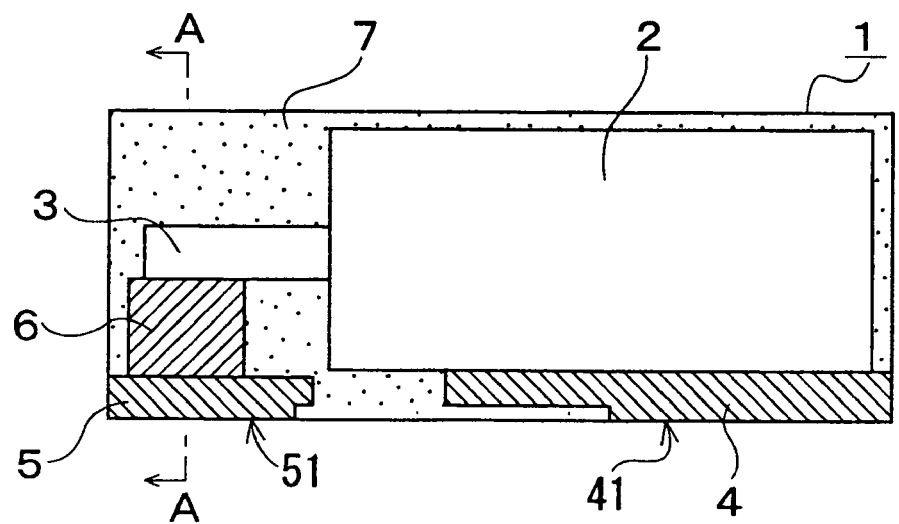
FIG. 2 is a partially broken side view of the solid electrolytic capacitor.
Figure 3:
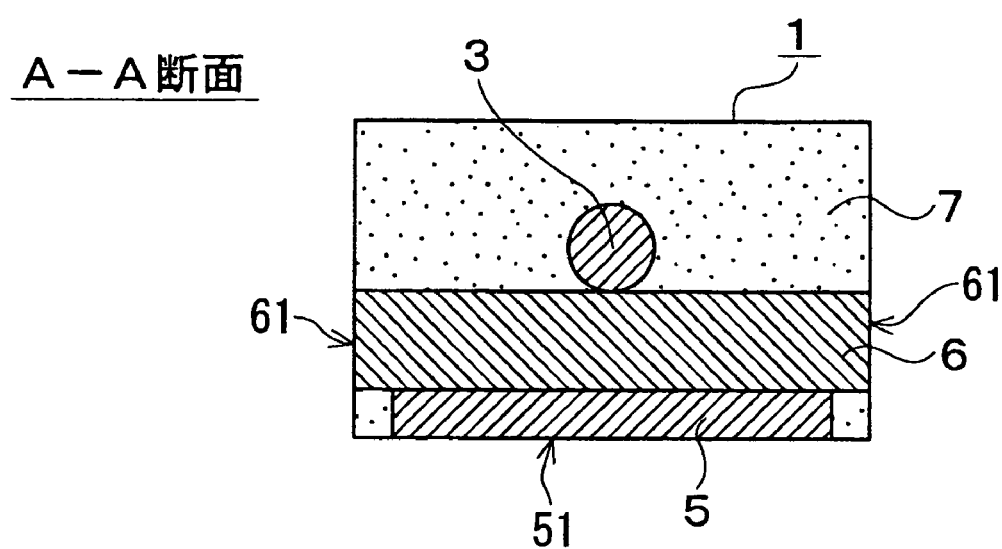
FIG. 3 is a sectional view along A-A line in FIG. 2.

As shown in FIG. 2, a solid electrolytic capacitor 1 of the present invention includes a capacitor element 2 having an anode lead member 3 projected therefrom, an anode terminal 5 arranged below the anode lead member 3 of the capacitor element 2, a cathode terminal 4 placed on a reverse surface of the capacitor element 2, and a mold resin portion 7 coating the capacitor element 2, the anode terminal 5 and the cathode terminal 4. A metal bolster member 6 between the anode lead member 3 and the anode terminal 5 connects the anode lead member 3 to the anode terminal 5. The bolster member 6 is formed so as to have a rectangular cross section. As shown in FIG. 1, a reverse surface 51 of the anode terminal 5 and a reverse surface 41 of the cathode terminal 4 are exposed on a reverse surface of the mold resin portion 7 to allow the solid electrolytic capacitor 1 to be surface-mounted on a circuit board. As shown in FIG. 3, the bolster member 6 has both ends thereof extended to both side surfaces of the mold resin portion 7 to expose both end surfaces 61, 61 thereof from both the side surfaces of the mold resin portion 7 (see FIG. 1).

Figure 4:
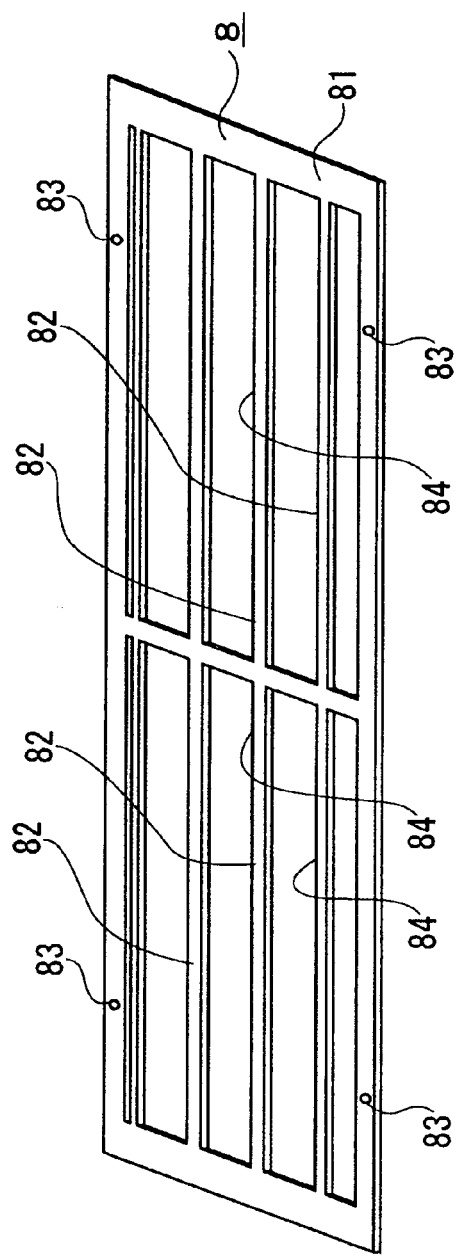
FIG. 4 is a perspective view of a bolster frame.
Figure 5:
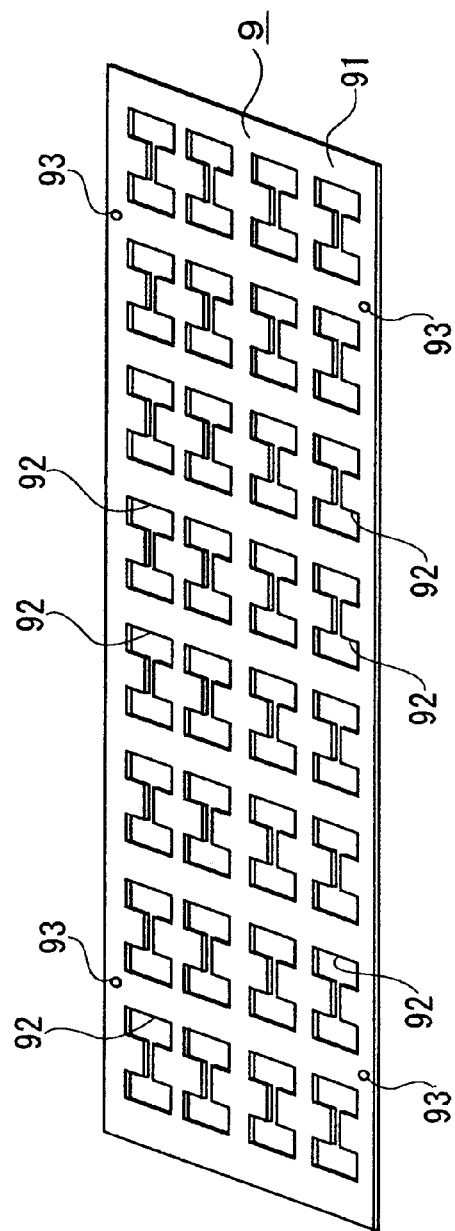
FIG. 5 is a perspective view of a terminal frame.

The above-described solid electrolytic capacitor 1 of the present invention is produced by a manufacturing process shown in FIG. 4 to FIG. 9. First, as shown in FIG. 4, a bolster frame 8 is produced which is formed by forming a plurality of rectangular openings 84 in a metal plate 81. In the bolster frame 8, a rod-like piece 82 is defined between two adjacent rectangular openings 84, 84, so that a plurality of rod-like pieces 82 will be aligned parallel to each other at constant spacings. A plurality of positioning holes 83 are provided on the outer periphery of the bolster frame 8. As shown in FIG. 5, a terminal frame 9 is also produced which is formed by forming a plurality of H-shaped openings 92 in a matrix form in a metal plate 91. In the terminal frame 9, the formation of the plurality of H-shaped openings 92 will define unit terminal areas in rows and columns in a matrix form as shown in FIG. 5, each including a cathode terminal portion 94 and an anode terminal portion 95 shown in FIG. 10. A plurality of positioning holes 93 are provided on the outer periphery of the terminal frame 9.

Figure 6:
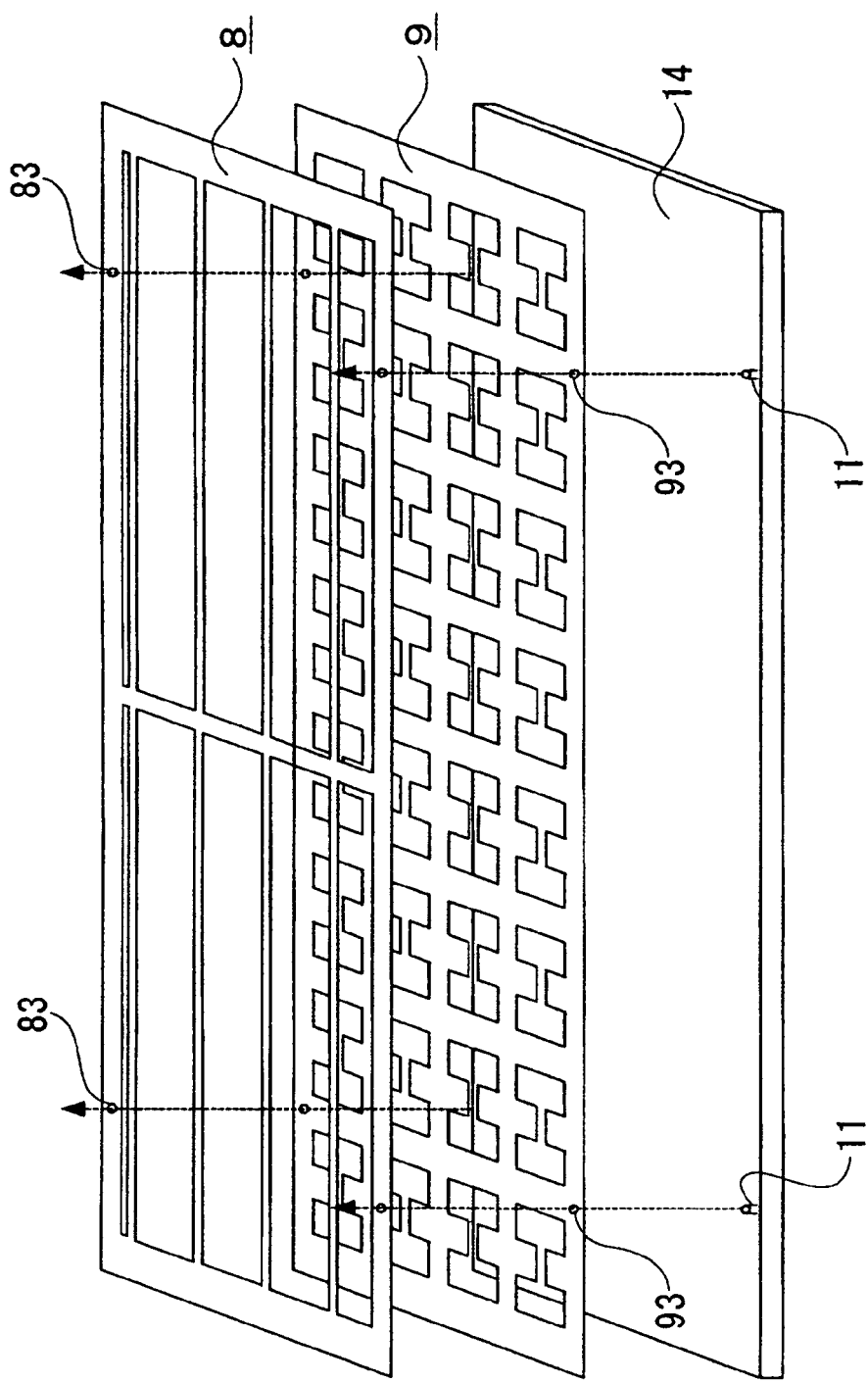
FIG. 6 is a perspective view showing a process for stacking the terminal frame and the bolster frame on a laminate jig.
Figure 7:
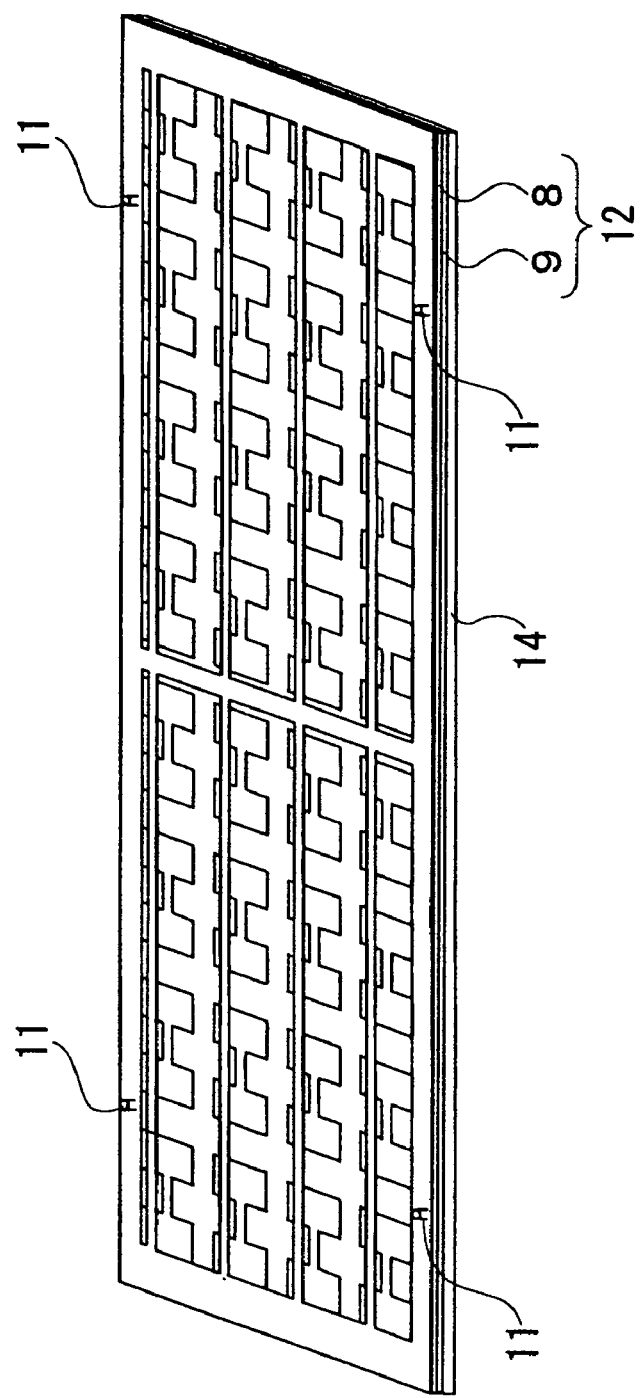
FIG. 7 is a perspective view of a united frame on the laminate jig.

Next, as shown in FIG. 6 and FIG. 7, the terminal frame 9 is placed on a laminate jig 14, and then the bolster frame 8 is placed on top of the terminal frame 9. At this time, a plurality of positioning pins 11 projecting from the laminate jig 14 are fitted into the respective positioning holes 93 of the terminal frame 9 and positioning holes 83 of the bolster frame 8 to define a relative position of the bolster frame 8 and the terminal frame 9. Consequently, as shown in FIG. 10, each rod-like piece 82 of the bolster frame 8 will lie along surfaces of a plurality of aligned anode terminal portions 95 of the terminal frame 9 on a predetermined position on these anode terminal portions 95.

Figure 8:
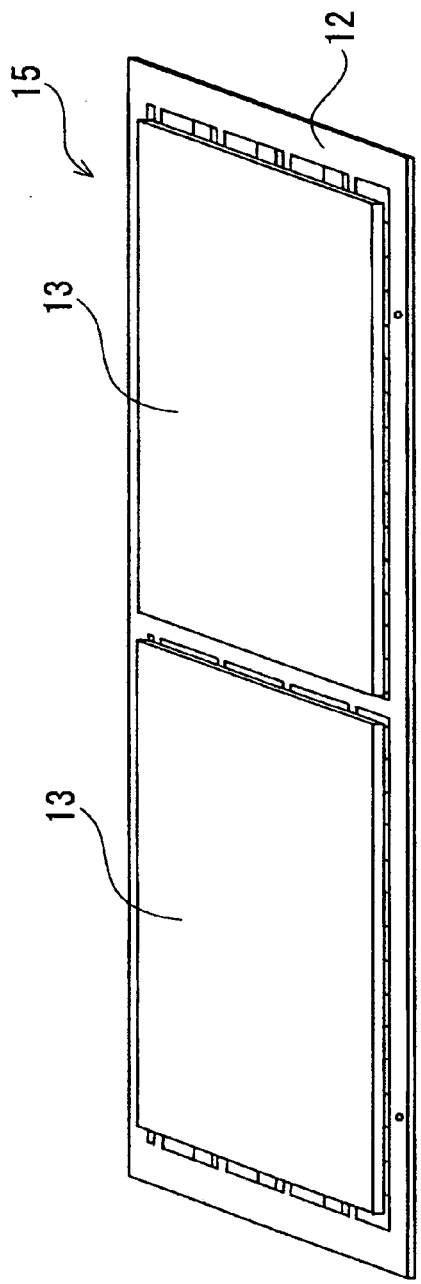
FIG. 8 is a perspective view showing an element complex.
Figure 11:
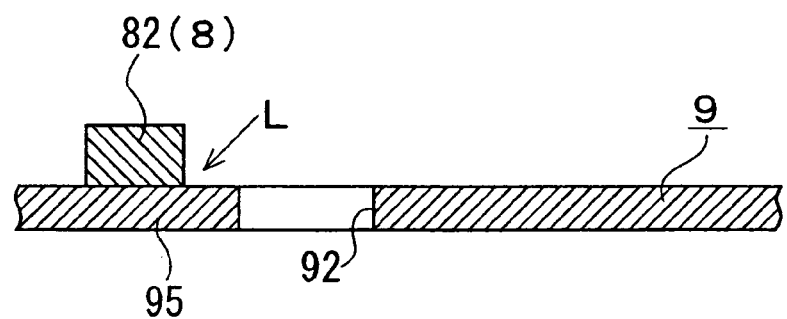
FIG. 11 is a sectional view showing a welding process.
Figure 12:
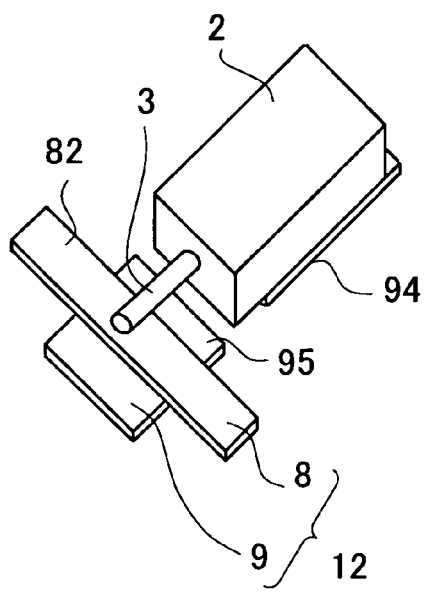
FIG. 12 is a perspective view of a capacitor element mounted on the united frame.
Figure 13:
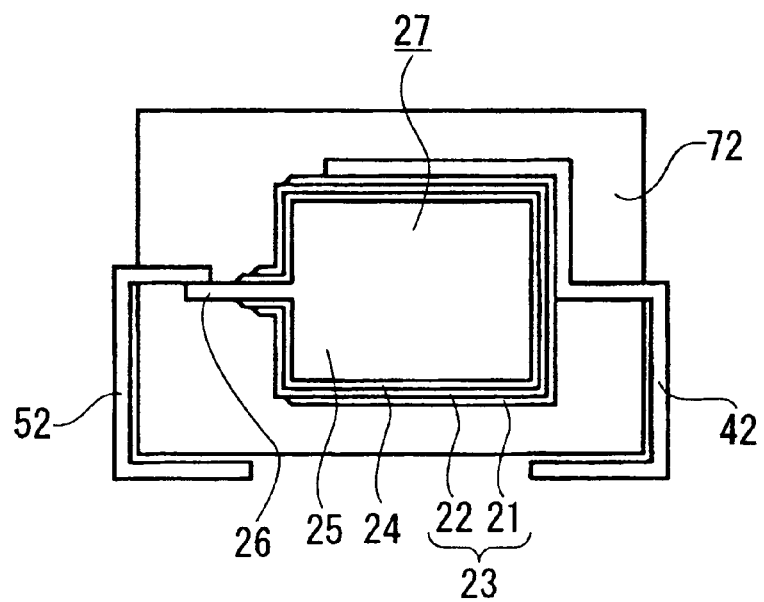
FIG. 13 illustrates a structure of a typical conventional solid electrolytic capacitor.
Figure 14:
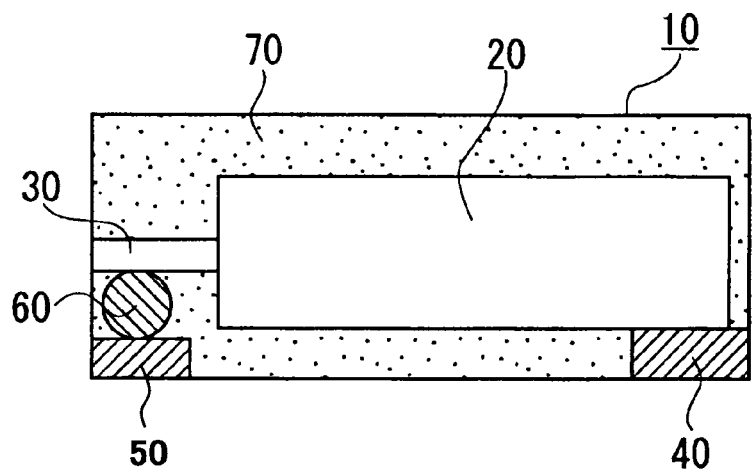
FIG. 14 is a sectional view of a solid electrolytic capacitor conventionally proposed.
Figure 15:
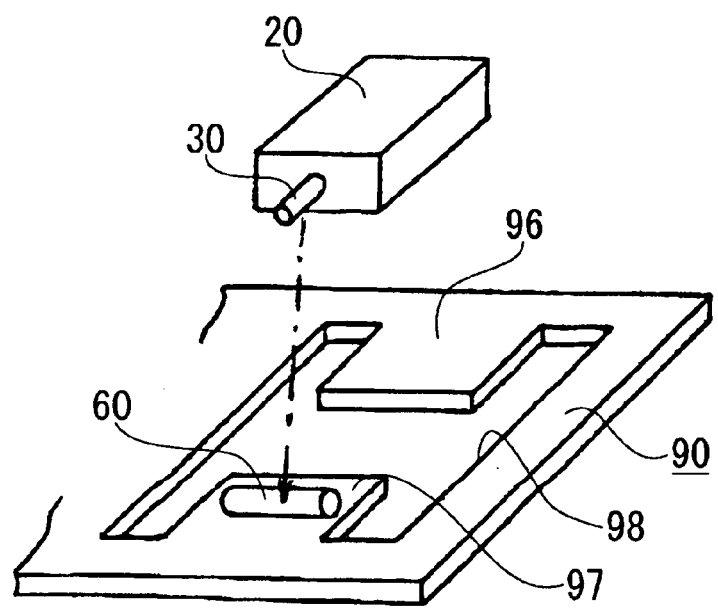
FIG. 15 is a perspective view illustrating a manufacturing process for the solid electrolytic capacitor.

Next, as shown in FIG. 11, a laser beam L is irradiated obliquely from the cathode terminal portion 94 side to a joint of the rod-like piece 82 of the bolster frame 8 and the anode terminal portion 95 of the terminal frame 9 to laser-weld the rod-like piece 82 of the bolster frame 8 to the anode terminal portion 95 of the terminal frame 9. This will provide one united frame 12 having the bolster frame 8 united with the terminal frame 9 on the laminate jig 14 as shown in FIG. 7. Subsequently, as shown in FIG. 12, a capacitor element 2 is placed on each unit terminal area of the united frame 12. An anode lead member 3 of each capacitor element 2 is joined to the rod-like piece 82 of the bolster frame 8, while a cathode portion exposed on a bottom surface of the capacitor element 2 is joined to the cathode terminal portion 94 of the terminal frame 9, to make an electrical connection. Thereafter, the united frame 12 is removed from the laminate jig 14. A mold resin 13 is charged covering all capacitor elements on the united frame 12 as shown in FIG. 8 to produce an element complex 15. Finally, the element complex 15 is cut by a dicing saw along predetermined cutting lines indicated by broken lines in FIG. 9. The rod-like piece 82 is thereby cut into the bolster member 6 of each capacitor element 2, while the terminal frame 9 is cut to allow the anode terminal portion 95 and the cathode terminal portion 94 to serve as the anode terminal 5 and the cathode terminal 4, respectively, to provide a plurality of solid electrolytic capacitors 1 of the present invention shown in FIG. 1 to FIG. 3 at a time.

Figure 9:
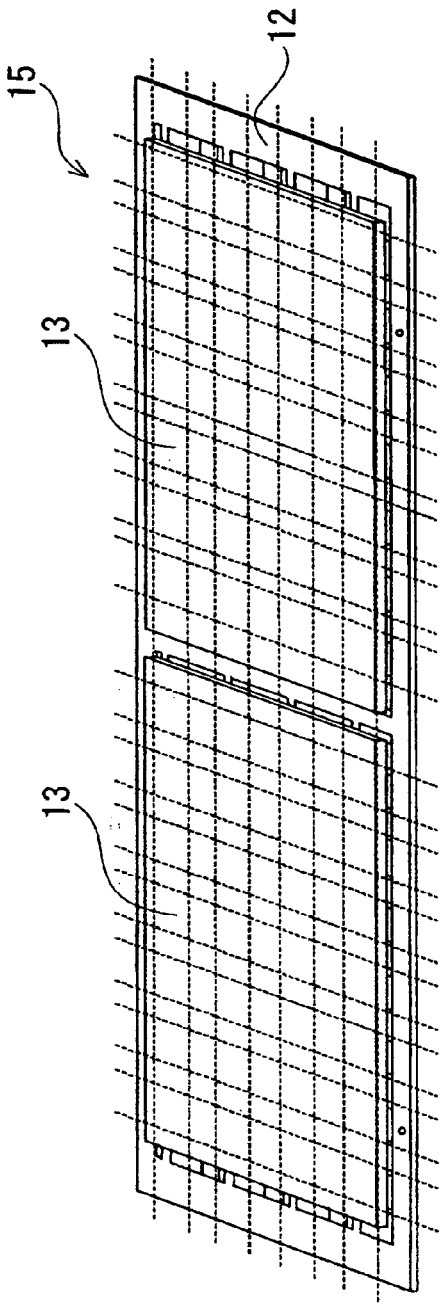
FIG. 9 is a perspective view showing cutting lines against the element complex.
Figure 10:
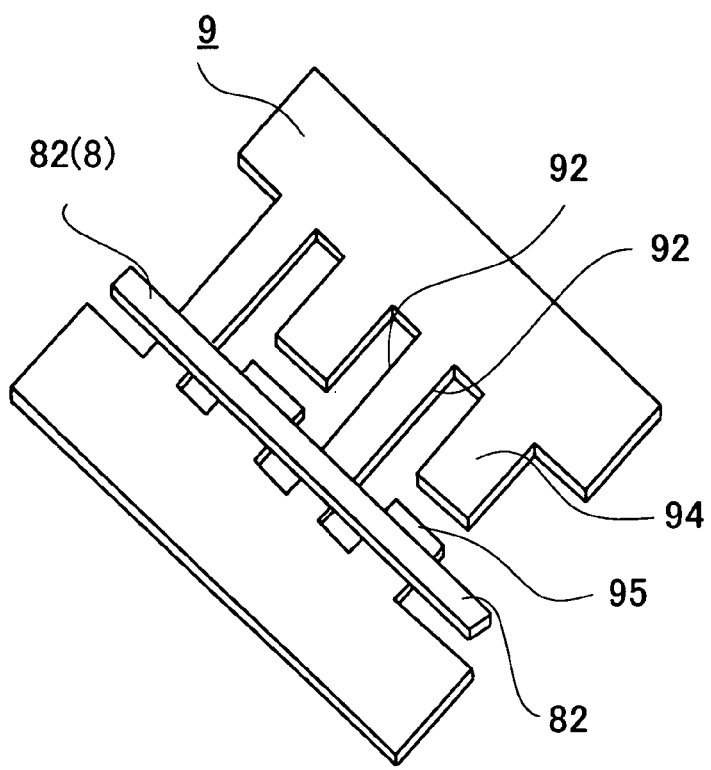
FIG. 10 is a perspective view showing a position relationship of a rod-like piece to anode terminal portions of the terminal frame.

In the above-described manufacturing method for the solid electrolytic capacitor 1 of the present invention, the bolster frame 8 is placed on the surface of the terminal frame 9 as shown in FIG. 6, so that each rod-like piece 82 of the bolster frame 8 is placed across all anode terminal portions 95 aligned in the terminal frame 9 as shown in FIG. 10. Consequently, the rod-like pieces 82 are positioned accurately at a time relative to all anode terminal portions 95 arranged in a matrix form in the terminal frame 9 along with accurate positioning between the bolster frame 8 and the terminal frame 9. Therefore, a high yield and high productivity can be realized in manufacture of the solid electrolytic capacitor 1. Moreover, as shown in FIG. 11, because laser welding is used as a method for fixing the rod-like piece 82 of the bolster frame 8 to the anode terminal portion 95 of the terminal frame 9, there is little temperature drop due to dissipation of heat of a weld through the rod-like piece 82 to allow welding with high reliability. Furthermore, during the laser welding, the laser beam L is irradiated from the cathode terminal portion 94 side, so that a welded fixed portion between the rod-like piece 82 and the anode terminal portion 95 is formed at an end of the cathode terminal portion 94 side. Therefore, the welded fixed portion between the rod-like piece 82 and the anode terminal portion 95 is not cut even if a minor error occurs in a cutting position when the element complex 15 is cut as shown in FIG. 9. In addition, a joint surface between the rod-like piece 82 and the anode terminal portion 95 is formed flat to thereby provide high adhesion between the rod-like piece 82 and the anode terminal portion 95. This can result in high reliability in mechanical and electrical connection between the bolster member 6 and the anode terminal 5 in the produced solid electrolytic capacitor 1.

What is claimed is:

1. A solid electrolytic capacitor comprising a capacitor element including an anode portion and a cathode portion and having an anode lead member projected from the anode portion, an anode terminal electrically connected to the anode lead member, a cathode terminal placed on a reverse surface of the capacitor element and electrically connected to the cathode portion, and a mold resin portion coating the capacitor element, the anode terminal and the cathode terminal, the anode terminal and the cathode terminal being exposed from the mold resin portion, wherein a bolster member between the anode lead member and the anode terminal makes an electrical connection between the anode lead member and the anode terminal, the bolster member and the anode terminal being joined to each other by laser welding with a laser beam irradiated from the cathode terminal side, the bolster member being formed so as to have a rectangular cross section, and having both ends thereof extended to both side surfaces of the mold resin portion to expose both end surfaces thereof from both the side surfaces of the mold resin portion.

2. A manufacturing method for a solid electrolytic capacitor comprising a capacitor element including an anode portion and a cathode portion and having an anode lead member projected from the anode portion, an anode terminal electrically connected to the anode lead member, a cathode terminal placed on a reverse surface of the capacitor element and electrically connected to the cathode portion, and a mold resin portion coating the capacitor element, the anode terminal and the cathode terminal, the method for manufacturing the solid electrolytic capacitor comprising:

a terminal frame producing step of producing a metal terminal frame having aligned in one or more lines unit terminal areas each including an anode terminal portion and a cathode terminal portion to serve as an anode terminal and a cathode terminal of one solid electrolytic capacitor;

a united frame producing step of placing a metal rod-like piece with a rectangular cross section on a surface of the produced terminal frame along a plurality of aligned anode terminal portions across these anode terminal portions, and fixing the rod-like piece to the terminal frame to thereby produce a united frame;

an element complex producing step of placing capacitor elements in the respective unit terminal areas of the produced united frame, and covering these capacitor elements by a mold resin, with an anode lead member of each capacitor element being joined to the rod-like piece of the united frame and with a cathode portion thereof being joined to the cathode terminal portion, to thereby produce an element complex; and a cutting step of cutting the produced element complex for each capacitor element to provide a plurality of solid electrolytic capacitors.

3. The manufacturing method for a solid electrolytic capacitor according to claim 2, wherein the terminal frame producing step comprises producing a terminal frame having a plurality of unit terminal areas arranged in rows and columns in a matrix form, and the united frame producing step comprises preparing a metal bolster frame having rod-like pieces arranged parallel at row spacings of the unit terminal areas, and laying the bolster frame on a surface of the terminal frame to fix the rod-like pieces to respective surfaces of a plurality of anode terminal portions aligned in columns.

4. The manufacturing method for a solid electrolytic capacitor according to claim 3, wherein the united frame producing step comprises fixing the bolster frame to the terminal frame by laser welding.

5. The manufacturing method for a solid electrolytic capacitor according to claim 4, wherein the united frame producing step comprises irradiating a laser beam from the cathode terminal portion side to joints of the rod-like pieces and the anode terminal portions when the bolster frame is fixed to the terminal frame by laser welding.

6. The manufacturing method for a solid electrolytic capacitor according to claim 3, wherein the bolster frame is provided by providing a plurality of rectangular openings at constant intervals in a metal plate, and the rod-like piece is defined between two adjacent rectangular openings.

7. The manufacturing method for a solid electrolytic capacitor according to claim 6, wherein the terminal frame and the bolster frame have formed thereon a positioning portion and a positioning receiving portion to engage each other for positioning both the frames.

* * * * *